Dec. 10, 1929.  H. JAEDIKE  1,739,361
PISTON RING
Filed March 2, 1929
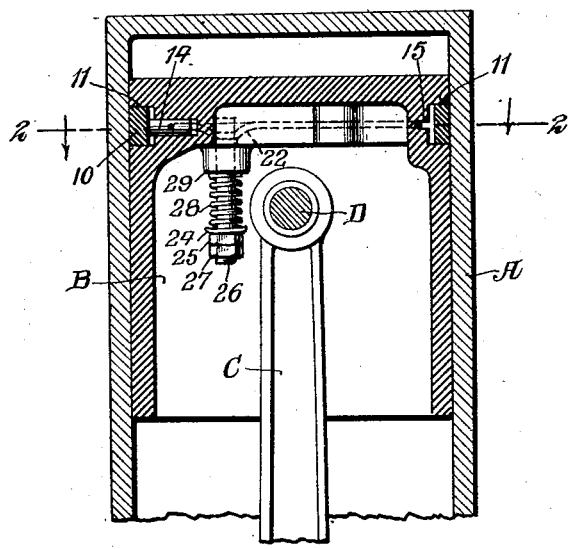
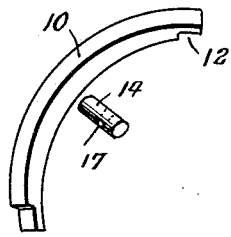
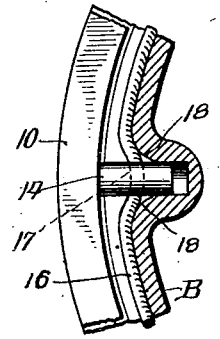
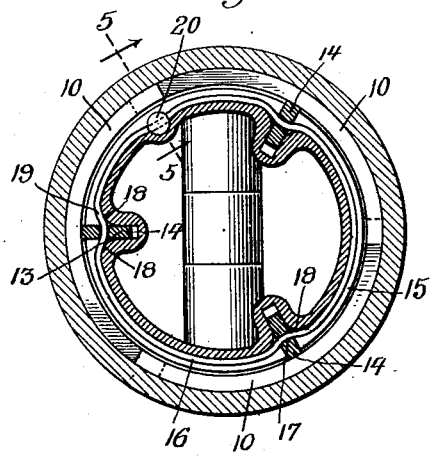
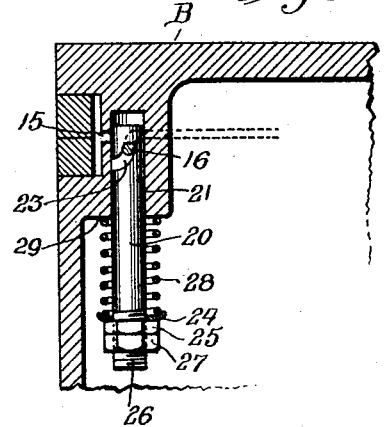
WITNESSES
INVENTOR
Henry Jaedike
BY
ATTORNEY Patented Dec. 10, 1929

1,739,361

UNITED STATES PATENT OFFICE

HENRY JAEDIKE, OF BROOKLYN, NEW YORK

PISTON RING

Application filed March 2, 1929. Serial No. 343,969.

This invention relates generally to means for establishing a seal between relatively movable elements, and refers particularly to an improved packing or piston ring.

The invention broadly comprehends means for establishing a seal between a piston ring and a cylinder wall which includes a plurality of arcuate ring forming sections carried by and encircling the piston, together with means for imparting outward movement of the sections with respect to the piston for preventing leakage of fluid resulting in loss of compression or power or entrance of oil to the combustion chamber of internal combustion motors.

The invention further aims to provide in a piston mounted for reciprocatory movement in a cylinder, means which in addition to establishing a seal between the piston and cylinder walls, serves to accurately space the piston wall from the cylinder wall to avoid undue wear and friction.

More specifically, the invention contemplates means for imparting outward relative movement of the sections of a sectional piston ring which embodies radial plungers, a common flexible element extending freely through said plungers and tensioned means for exerting a pull on the flexible element to urge the plungers radially outward and for tensioning the same against radial inward movement.

Among its other objects the invention aims to provide an improved means for establishing a seal between relatively movable elements which operates to more effectually perform its function without unduly complicating the structure or materially increasing the cost of production and installation.

With the above recited and other objects in view, reference is had to the following description and accompanying drawings, in which there is exhibited one example or embodiment of the invention, while the claims define the actual scope of the same.

In the drawings:

Figure 1 is a vertical sectional view through a cylinder and piston equipped with the sealing means constructed in accordance with the invention.

Figure 2 is a horizontal sectional view therethrough, taken approximately on the line indicated at 2—2 in Figure 1.

Figure 3 is a perspective view of one of the ring sections with its plunger in juxtaposition.

Figure 4 is an enlarged fragmentary horizontal sectional view taken in the same plane as Figure 2.

Figure 5 is an enlarged fragmentary vertical sectional view taken approximately on the line indicated at 5—5 in Figure 2.

Referring to the drawings by characters of reference, A designates a cylinder, and B a piston which is mounted therein for reciprocation by means of a connecting rod C fulcrumed to a wrist pin D or by any other equivalent means. The sealing means constituting the subject matter of the present invention consists of a plurality of arcuate ring forming members or sections 10 which are preferably mounted in a peripheral groove 11 formed in the piston B and which sections are provided at their opposite ends with mating rabbeted portions 12 to provide the usual overlap for preventing leakage therebetween. The piston is further provided with a plurality of inwardly extending radial sockets 13 which receive and guide plungers 14 corresponding in number to the number of ring sections 10 and which obviously are adapted upon radial outward movement to urge the ring sections radially outward against the inner wall of the cylinder A.

In order to provide means for urging the plungers 14 radially outward and for tensioning the same against radial inward movement, the piston B is provided with a second annular groove 15 of a reduced size with respect to the ring section groove 11 and which latter groove communicates with the former intermediate its width and obviously extends inwardly therefrom. A flexible element or cable 16 is disposed within the groove 15 and is trained through transverse openings 17 formed in the plungers 14. It will also be observed that the plunger sockets 13 intersect the groove 15, and at their point of intersection are provided with laterally flared walls 18, into which portions 19 of the cable are offset due to radial inward movement of the ring sections 10 under their contact with the inner wall of the cylinder A. The plunger urging means further includes an axially movable shaft 20 which is mounted and guided in a bore 21 which extends axially of the piston B and which bore intersects the groove 15. At the point of intersection of the bore 21 with the groove 15, said bore is provided with a laterally and upwardly flared mouth 22. The upper end of the shaft 20 is provided with a notch 23 engaging over the cable while the lower end of the shaft which protrudes beyond and below the bore 21 is provided with a spring seat 24 adjustable axially of the shaft by means of a nut 25 threaded on the threaded lower end 26 of the shaft. A binding or retaining nut 27 serves to lock the nut 25 in its adjusted position. A coiled expansion spring 28 has one end seated in the spring seat 24 with the opposite upper end bearing against the internal shoulder 29 formed in the piston, said spring embracing the shaft.

In operation, the spring 28 functions normally to exert a force to move the shaft 20 downwardly to exert a circumferential pull on the flexible element or cable 16 at the point where the notched portion 23 of the shaft engages the same. Obviously, this circumferential pull tends to straighten out the inwardly offset portions 19 of the flexible element or cable 16 resulting in outward radial movement of the plungers 14 and consequent outward radial movement of the ring sections 10 to equally force the ring sections into engagement with the cylinder wall. Conversely, the ring sections act on the plungers 14 and the flexible element and cable to center the piston B with respect to the cylinder bore. The spring 28 also functions to tension the ring sections against radial inward movement, thereby insuring at all times a sealing contact of the ring sections with the cylinder bore. Obviously, when excessive wear on the outer surface of the ring sections occurs, the tension of the spring 28 may be increased by adjustment of the nuts 25 and 27.

What is claimed is:

1. In a piston mounted for reciprocatory movement in a cylinder, means for establishing a seal between the piston and cylinder walls including arcuate ring forming sections carried by and encircling the piston, means for imparting outward movement thereto with respect to the piston comprising a plunger for each ring section mounted for radial movement in the piston, a circumferentially disposed flexible element extending freely through said plungers, guide surfaces formed on the piston adjacent each plunger into which portions of said element are offset inwardly and a member acting on said flexible element to cause the inwardly offset portions to move outwardly for imparting outward motion to said ring sections.

2. In a piston mounted for reciprocatory movement in a cylinder, means for establishing a seal between the piston and cylinder walls including arcuate ring forming sections carried by and encircling the piston, means for imparting outward movement thereto with respect to the piston comprising a plunger for each ring section mounted for radial movement in the piston, a circumferentially disposed flexible element extending freely through said plungers, guide surfaces formed on the piston adjacent each plunger into which portions of said element are offset inwardly, an axially movable member engaging said flexible element and tensioned means for moving said member axially to cause the inwardly offset portions of the flexible element to move outwardly for imparting outward motion to the ring sections through the radial outward movement of said plungers.

3. In a piston mounted for reciprocatory movement in a cylinder, means for establishing a seal between the piston and cylinder walls including arcuate ring forming sections carried by and encircling the piston, means for imparting outward movement thereto with respect to the piston comprising a plunger for each ring section mounted for radial movement in the piston, a circumferentially disposed flexible element extending freely through said plungers, guide surfaces formed on the piston adjacent each plunger into which portions of said element are offset inwardly, an axially movable member engaging said flexible element, tensioned means for moving said member axially to cause the inwardly offset portions of the flexible element to move outwardly for imparting outward motion to the ring sections through the rapid outward movement of said plungers and means for adjusting the tension of said tensioned means.

4. In a piston mounted for reciprocatory movement in a cylinder, means for establishing a seal between the piston and cylinder walls including arcuate ring forming sections, said piston having an annular ring receiving groove in which the ring forming sections are mounted and means for imparting radial outward movement thereto with respect to the piston comprising an annular grooved portion of the piston extending inwardly from and communicating with the first mentioned groove, circumferentially spaced radially disposed sockets intersecting the latter groove and communicating with the former groove, said latter groove having outwardly flared inwardly offset portions at the point of intersection with the sockets, plungers mounted in said sockets having transverse apertures, a circumferential endless flexible element extending around the piston within the latter groove and extending through the transverse apertures of the plungers with portions offset inwardly into the flared portions of said latter groove and means exerting a tensioned axial pull on said flexible element.

5. In a piston mounted for reciprocatory movement in a cylinder, means for establishing a seal between the piston and cylinder walls including arcuate ring forming sections, said piston having an annular ring receiving groove in which the ring forming sections are mounted and means for imparting radial outward movement thereto with respect to the piston comprising an annular grooved portion of the piston extending inwardly from and communicating with the first mentioned groove, circumferentially spaced radially disposed sockets intersecting the latter groove and communicating with the former groove, said latter groove having outwardly flared inwardly offset portions at the point of intersection with the sockets, plungers mounted in said sockets having transverse apertures, a circumferential endless flexible element extending around the piston within the latter groove and extending through the transverse apertures of the plungers with portions offset inwardly into the flared portions of said latter groove, means exerting a tensioned axial pull on said flexible element consisting of a shaft having a notched portion at one end engaging over the flexible element and a spring for moving the same axially.

Signed at New York, in the county of New York and State of New York this 1st day of March, 1929.

HENRY JAEDIKE.